2,926,052
Patented Feb. 23, 1960

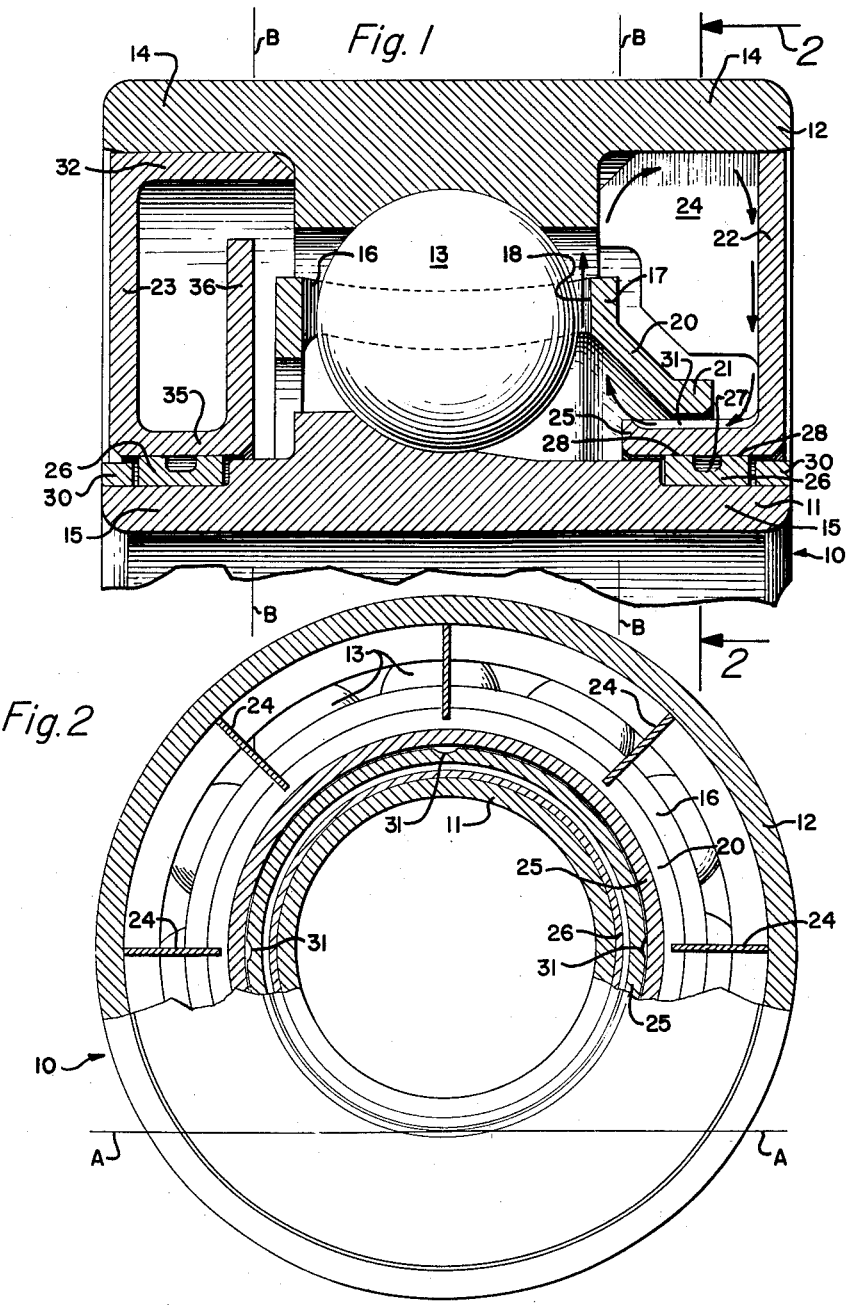
Feb. 23, 1960     E. S. CAIN, JR     2,926,052
ANTIFRICTION BEARING CONSTRUCTION
Filed Jan. 28, 1958
INVENTOR.
EARL S. CAIN JR.
ATTORNEY

2,926,052
ANTIFRICTION BEARING CONSTRUCTION

Earl S. Cain, Jr., Scottsdale, Ariz., assignor to The Garrett Corporation, Los Angeles, Calif., a corporation of California Application January 28, 1958, Serial No. 711,640

8 Claims. (Cl. 308—187)

This invention relates generally to bearings; it is more particularly directed to antifriction bearings of the ball or roller type which usually require lubrication.

In some modern apparatus such as turbines and the like, parts are driven at extremely high speeds and are sometimes located in positions and operated under conditions in which they are exposed to high temperatures. Frequently such parts are so disposed that, after the supporting bearings have been initially lubricated and the parts placed in operation, the bearing cannot be relubricated. If the grease or other lubricant escapes or is otherwise dissipated, the bearings may fail and, consequently, the part may be rendered useless.

An object of this invention, therefore, is to provide an antifriction bearing having novel means for receiving, circulating, and retaining a lubricating medium therein.

Another object of the invention is to provide an antifriction bearing having reservoir means for retaining lubricant, in either fluid or semisolid states, in the bearing regardless of the attitude of the bearing.

Another object of the invention is to provide an antifriction bearing having reservoir means so constructed that a body of semisolid lubricant will be retained in a stationary position therein regardless of the attitude of the bearing.

Still another object of the invention is to provide an antifriction bearing having means for causing oil or other fluid ingredient of a lubricating medium to flow in a predetermined path within the bearing to effect better lubrication of the bearing parts and prolong the useful life of the lubricating medium.

A further object of the invention is to provide an antifriction bearing having means for maintaining antifriction elements of the bearing in spaced relation, the spacing means being designed to minimize friction and consequent heat generation and to serve as part of the lubricant-circulating means in the bearing.

It is also a further object of the invention to provide an antifriction bearing having a stationary outer race, a ball separator means, and an intermediate piece carried by the outer race, the intermediate piece having a guiding portion for rubbing engagement with the separator means so located that the surface velocity at the rubbing points will be as small as possible consistent with the speed of operation of the movable elements of the bearing. The intermediate piece is also shaped to serve as a part of the lubricant-retaining reservoir and the lubricant-circulating and sealing systems.

A still further object of the invention is to provide an antifriction bearing having means for causing a lubricant which has been softened to flowable consistency to flow in desired paths and thus be made to contact parts of the bearing requiring lubrication.

Another object of the invention is to provide a bearing having sealing means between moving parts so disposed that any friction caused thereby will be reduced to a minimum, yet the loss of the lubricating medium will be precluded.

An object also is to form the sealing means mentioned in the preceding paragraph from a material having a different coefficient of expansion from the parts which it engages so that, when the temperatures of the bearing parts increase during use of the bearing, the sealing elements will more firmly engage the adjacent bearing parts to further preclude the loss of lubricant, which may have become more fluid because of the temperature rise.

Other objects and advantages will be apparent from the following description of the embodiment of the invention shown in detail in the accompanying drawing. In the drawing:

Figure 1 is a vertical sectional view taken through a bearing formed in accordance with the present invention; and Fig. 2 is a vertical sectional view partly in side elevation, taken through the bearing shown in Fig. 1 on the plane indicated by the line 2—2 of Fig. 1.

Referring more particularly to the drawing, the numeral 10 designates the bearing in its entirety. This bearing includes inner and outer race elements 11 and 12, which are of substantially conventional construction in that each has a groove substantially midway between the sides to receive ball or other antifriction members 13 for rolling engagement with the races, the elements 13 serving to maintain the races in spaced relation and permit relative rotary movement thereof. In the form of the invention illustrated, the races 11 and 12 are reduced in thickness, as at 14 and 15, respectively, on each side of the ball-receiving grooves, the reductions of these portions increasing the lubricant-receiving and storing capacity of the bearing and providing space for receiving sealing means.

While the bearing illustrated is shown with ball type antifriction elements 13 and appropriately formed race rings, it is obvious that rollers or other antifriction elements and ring configurations could be employed with equal facility.

To maintain the ball elements 13 in spaced relation, a separator device 16 is provided, this device having a ringlike body portion 17 of shallow channel-shaped cross section in which ball-receiving openings 18 are provided. The open side of the channel shape of the separator faces inwardly, and the inner surface areas thereof around the ball openings between the channel sides serve as means for retaining and feeding the lubricant to the balls as the separator and balls revolve. A skirt 20 extends downwardly and outwardly from one side of the body portion 17, this skirt terminating in a laterally directed flange 21 for purposes which will be apparent from the following description.

It will be seen in Fig. 1 of the drawing that the space between the inner and outer race members 11 and 12 may receive a quantity of grease or other lubricating medium which serves to facilitate the rolling action and eliminate, as much as possible, friction between the moving parts of the bearing. This lubricant is retained in the space between the races by wall members 22 and 23, such members being pressed into or otherwise located in place during the assembly of the bearing. These wall members are so constructed and of such size that they will form a fluid-tight engagement with the inner surface of the outer race member 12.

Wall member 22 is provided with inwardly directed vanes, or partition elements 24, these elements being spaced circumferentially about the wall 22, as clearly illustrated in Fig. 2. The outer edges of the partitions also engage the inner surface of the outer race, and serve to prevent lubricant which has softened to flowable condition from swirling in the outer race during the use of the bearing. At its inner edge, the wall 22 is provided with an inwardly directed flange 25, which is spaced from the outer surface of the inner race 11 a limited distance to permit relative movement of these elements. The bearing illustrated in the drawing is intended to be mounted in a housing, with the outer race held stationary. Some features of the invention are applicable to bearings wherein the outer race is movable, but the invention is more particularly directed to a bearing of the first type; that is, a bearing in which the inner race supports a shaft or other rotatable device.

To prevent the escape of lubricating medium through the space between the flange 25 and the inner race 11, a sealing ring 26 is mounted in such shape, this ring being formed from a different material than the ring 11 and flange 25, and preferably of a resilient plastic material such as Teflon. Ring 26 has a groove 27 formed in the periphery to provide a plurality of spaced surfaces 28, which lightly engage the inner surface of the flange 25 when the bearing is at relatively low temperatures. The sealing ring 26 is normally in close but running engagement with the inner race.

When the bearing is cold or not in active operation, the surfaces 28 may merely engage the inner surface of the flange 25, but after the bearing has been placed in operation the material of the sealing ring will expand, due to the coefficient of expansion thereof being greater than that of flange 25, until the surfaces 28 relatively tightly engage the flange, after which lubricant, reduced to a fluid state, will be prevented from flowing through the space between the sealing ring and the flange. If during initial operation of the device, the ring 26 tends to rotate with the inner race, the centrifugal force of the ring 26 will also cause the ring size to tend to increase, which tightens the ring on the flange 25. This engagement holds the seal ring stationary with a minimum of clearance between the sides thereof and the adjacent surfaces of the inner race 11. The sealing ring 26 may be retained in place between the inner race 11 and flange 25, by a retaining ring 30 which may be pressed onto or otherwise secured to the reduced portion 15 of the ring 11. The seal ring 26 could obviously be inserted in other ways, such as by molding it in place or by heating to expand and then shrinking it into place.

It will be observed from the drawing that the flange 21 of the separator 16 is slightly larger in diameter than the flange 25 of the wall 22. These flanges are disposed in substantially concentric relationship, the flange 21 serving to maintain the separator in position between the race elements 11 and 12. The flange 21 is relatively narrow in width, and has been located adjacent the flange 25 for two reasons; first, to provide an annular guiding surface at a location in the bearing where the surface speed and area are the smallest, thus keeping the friction and temperature resulting therefrom at a minimum. The second reason is to provide means for guiding the lubricant during circulation thereof.

When the bearing is in operation, the separator 16 will be revolved by the balls 13 rolling between the races. Since the bearing is intended for high speed operation, the centrifugal force will be relatively high and will cause air and lubricant to flow outwardly along, and be thrown from, the separator into the outer portion of the space between the races. This outward movement of the lubricant and/or air will cause lubricant and lubricant-laden air previously disposed in the outer portion of the space to move inwardly along the wall 22 to the region adjacent the outer surface of the flange 25. This lubricant and air will flow through the space between the flanges 21 and 25 and be guided by the skirt 20 of the separator into engagement with the balls 13. Continued rotation will repeat the circulation of the lubricant. A pumping action is thus produced to cause fluid flow along the path indicated by arrows in Fig. 1.

The flow capacity of the space between the flanges 21 and 25 may be increased by forming grooves 31 in either or both of these flanges. These grooves also introduce lubricant to the flanges 21 and 25 in such a fashion and at a strategic position as to form hydrodynamic wedges in the annulus between them, and thereby reduce friction and heat.

Since the wall 22 has a fluid-tight relation with the outer race 12, a lubricant-retaining well will be formed when the bearing is in a vertical position, with a level indicated by the line A—A in Fig. 2. If the bearing is disposed in a horizontal position, the lubricant level will be determined by the inner edge of the flange 25 or 35 on the wall 22 or 23, whichever is in the lowermost position, as indicated by the lines B—B in Fig. 1. It is therefore obvious that, regardless of the attitude of the bearing, an ample supply of lubricant will be retained therein.

It should be obvious that the bearing may be made symmetrical about a plane passing through the centers of the antifriction elements 13. In the bearing illustrated, however, the wall 23 is provided at its periphery with a flange 32 for engagement with the inner surface of the reduced portion 14 of the outer race. This engagement forms a fluid-tight connection between the periphery of the wall 23 and the outer race 12. The inner edge of the wall 23 has a flange 35 projecting inwardly therefrom, this flange being similar to flange 25 in that the inner surface thereof is disposed in slightly spaced relation from the outer surface of the inner race for engagement by another sealing element 26. This element is retained in place by a retaining ring 30, as previously described. The flange 35 has an outwardly projecting wall 36, which strengthens the wall member 23. This wall 36 also provides a reservoir for semi-solid lubricant from which a lubricating film may seep during use of the bearing. The wall 36 is slightly spaced from the separator wall 17 so that any tendency of lubricant to flow along the wall 36 toward the inner race will be counteracted by the induced flow of air and lubricant caused by the centrifugal force resulting from the rotation of the separator.

The operation of the bearing may be summarized as follows: When the bearing is installed, the inner race will receive a shaft, or other rotating element not shown. As this element revolves, the inner race will also revolve, causing the ball elements 13 to roll within the outer race 12. As the temperature of the bearing increases and the lubricating medium becomes fluid, the separator 16, moving with the ball elements 13, will cause the lubricating medium, as well as air, to flow in an outward direction with considerable force, which in turn causes the lubricant to flow inwardly along the wall 22 and between the flanges 21 and 25. This pumping action of the separator 16 will keep the ball elements well supplied with lubricating medium. This lubricant feeding action is augmented by the gradual feeding of lubricant to the ball elements from the inner side of the separator member 16, as previously described. Such circulation of the lubricant will cause it to be maintained at a lower temperature and prevent vaporization thereof. The vanes or partitions 24 will prevent the fluid lubricant from swirling around the inner surface of the outer race, and guide it inwardly along the wall 22. Since seal rings 26 and the side and bottom walls adjacent which they are positioned provide a series of tortuous passages, and at least one wall at one side of each passage is revolving at high speed, the tendency of the lubricant to escape at these locations will be resisted.

I claim:

1. An antifriction bearing device comprising: inner and outer annular races; antifriction bearing elements disposed between said races, said elements being in rolling engagement with said races and serving to hold the same in positions to define an annular lubricant-receiving space; wall means in fluid-tight relation with said outer race, said wall means closing the ends of said annular space; flange means projecting into said space at the inner edges of said wall means, said flange means being spaced a limited distance from the outer surface of said inner race; and bearing element separator means having an annular portion extending around said bearing elements substantially midway between said races and a downwardly and laterally extending skirt terminating in a locating wall portion, the latter portion being disposed adjacent the outer surface of said flange means and spaced a limited distance therefrom.

2. An antifriction bearing device comprising: inner and outer annular races; antifriction bearing elements disposed between said races, said elements being in rolling engagement with said races and serving to hold the same in positions to define an annular lubricant-receiving space; a wall in fluid-tight relation with said outer race, said wall substantially closing one end of said annular space; partition means projecting into said annular space from said wall to interrupt the flow of lubricant around the inner surface of said outer race; flange means projecting into said space at the inner edge of said wall, said flange means being spaced a limited distance from the outer surface of said inner race; a sealing ring disposed between said inner race and said flange; and bearing element separator means having a locating wall portion disposed in limited spaced relation from the outer surface of said flange means.

3. An antifriction bearing device comprising: inner and outer annular races; antifriction bearing elements disposed between said races, said elements being in rolling engagement with said races and serving to hold the same in positions to define an annular lubricant-receiving space; a wall in fluid-tight relation with said outer race, said wall substantially closing one end of said annular space; partition means projecting into said annular space from said wall to interrupt the flow of lubricant around the inner surface of said outer race; flange means projecting into said space at the inner edge of said wall, said flange means being spaced a limited distance from the outer surface of said inner race; sealing ring means disposed between said inner race and said flange and providing a plurality of running seal surfaces in engagement with one thereof; and bearing element separator means having a locating wall portion disposed in limited spaced relation from the outer surface of said flange means.

4. An antifriction bearing device comprising: inner and outer annular races; antifriction bearing elements disposed between said races, said elements being in rolling engagement with said races and serving to hold the same in positions to define an annular lubricant-receiving space; a wall in fluid-tight relation with said outer race, said wall substantially closing one end of said annular space; circumferentially spaced partitions projecting substantially radially inward from said outer race; flange means projecting into said space at the inner edge of said wall, said flange means being spaced a limited distance from the outer surface of said inner race; a sealing ring disposed between said inner race and said flange means; and bearing element separator means having a locating wall portion spaced a limited distance from the outer surface of said flange means.

5. An antifriction bearing device comprising: inner and outer annular races; antifriction bearing elements disposed between said races, said elements being in rolling engagement with said races and serving to hold the same in positions to define an annular lubricant-receiving space; a wall in fluid-tight relation with said outer race, said wall substantially closing one end of said annular space; circumferentially spaced partitions projecting substantially radially inward from said outer race; flange means projecting into said space at the inner edge of said wall, said flange means being spaced a limited distance from the outer surface of said inner race; said flange means forming lubricant-conducting channels extending inwardly from said wall; a sealing ring disposed between said inner race and said flange means, said ring providing a running seal surface in engagement with said flange; and bearing element separator means having a locating wall portion disposed adjacent the outer surface of said flange means.

6. An antifriction bearing device comprising: inner and outer annular races; antifrication bearing elements disposed between said races, said elements being in rolling engagement with said races and serving to hold the same in positions to define an annular space; a first seal element at one end of said device, said seal element having an annular wall in fluid-tight relation with said outer race, said annular wall closing the end of the space between said races; partition means adjacent said outer race and annular wall to prevent the continuous flow of lubricant around the inner surface of the outer race; a flange extending inwardly from said annular wall in substantially parallel relationship with the outer surface of said inner race; a resilient sealing element disposed between the adjacent surfaces of said flange and inner race and having a running engagement with one of said surfaces; and a separator for said bearing elements, said separator having an annular wall with openings to receive said bearing elements and an inclined wall projecting from said annular wall toward and terminating in limited spaced relation from the outer surface of the flange on said first seal element.

7. An antifriction bearing device comprising: inner and outer annular races; antifriction bearing elements disposed between said races, said elements being in rolling engagement with said races and serving to hold the same in positions to define an annular lubricant-receiving space; wall means in fluid-tight relation with said outer race, said wall means closing the ends of said annular space; flange means projecting into said space at the inner edges of said wall means, said flange means being spaced a limited distance from the outer surface of said inner race; sealing ring means disposed between said inner race and said flange means; and bearing element separator means having a perforated ring-like portion disposed substantially midway between said races and receiving said bearing elements, said separator means also having a downwardly and laterally extending skirt terminating in a locating wall portion disposed adjacent the outer surface of said flange means and spaced a limited distance therefrom, said flange means having circumferentially spaced recesses extending from one side to the other of said locating wall portion.

8. An antifriction bearing device comprising: inner and outer annular races; antifriction bearing elements disposed between said races, said elements being in rolling engagement with said races and serving to hold the same in positions to define an annular lubricant-receiving space; wall means in fluid-tight relation with said outer race, said wall means closing the ends of said annular space; flange means projecting into said space at the inner edges of said wall means, said flange means being spaced a limited distance from the outer surface of said inner race; sealing ring means disposed between said inner race and said flange means, said sealing ring means having spaced portions engaging the inner surface of said flange means; and bearing element separator means having a perforated ring-like portion disposed substantially midway between said races and receiving said bearing elements, said separator means also having a downwardly and outwardly extending skirt terminating in a locating wall portion disposed adjacent the outer surface of said flange means and spaced a limited distance therefrom.

References Cited in the file of this patent

UNITED STATES PATENTS

| | | |
|---|---|---|
| 1,857,823 | Robinson | May 10, 1932 |
| 2,759,778 | Anderson | Aug. 21, 1956 |

UNITED STATES PATENT OFFICE
CERTIFICATE OF CORRECTION

Patent No. 2,926,052                        February 23, 1960

Earl S. Cain, Jr.

It is hereby certified that error appears in the printed specification of the above numbered patent requiring correction and that the said Letters Patent should read as corrected below.

Column 3, line 12, for "shape" read -- space --; column 6, line 6, for "antifrication" read -- antifriction --.

Signed and sealed this 9th day of August 1960.

(SEAL)
Attest:
KARL H. AXLINE
Attesting Officer

ROBERT C. WATSON
Commissioner of Patents